United States Patent
Li et al.

(10) Patent No.: US 12,040,678 B2
(45) Date of Patent: Jul. 16, 2024

(54) BRUSHLESS MOTOR AND ELECTRICAL EQUIPMENT

(71) Applicant: GUANGDONG WELLING MOTOR MANUFACTURING CO., LTD., Guangdong (CN)

(72) Inventors: Guoxiong Li, Guangdong (CN); Junfeng Hou, Guangdong (CN); Luqiang Zeng, Guangdong (CN); Jian Hu, Guangdong (CN); Hu Li, Guangdong (CN); Chengdong Huang, Guangdong (CN); Yangbo Huang, Guangdong (CN)

(73) Assignee: GUANGDONG WELLING MOTOR MANUFACTURING CO., LTD., Guangdong (CN)

( * ) Notice: Subject to any disclaimer, the term of this patent is extended or adjusted under 35 U.S.C. 154(b) by 265 days.

(21) Appl. No.: 17/526,557

(22) Filed: Nov. 15, 2021

(65) Prior Publication Data
US 2022/0077742 A1 Mar. 10, 2022

Related U.S. Application Data

(63) Continuation of application No. PCT/CN2019/111691, filed on Oct. 17, 2019.

(30) Foreign Application Priority Data

Jul. 26, 2019 (CN) .......................... 201910683827.X

(51) Int. Cl.
*H02K 5/173* (2006.01)
*F16C 41/00* (2006.01)
*H02K 7/08* (2006.01)

(52) U.S. Cl.
CPC ......... *H02K 5/1732* (2013.01); *F16C 41/002* (2013.01); *H02K 7/083* (2013.01); *F16C 2380/26* (2013.01)

(58) Field of Classification Search
None
See application file for complete search history.

(56) References Cited

U.S. PATENT DOCUMENTS

| 10,396,619 | B2 * | 8/2019 | Takayama | ............... F16C 19/54 |
| 2010/0253158 | A1 * | 10/2010 | Mizukami | ............. H02K 11/40 310/43 |

(Continued)

FOREIGN PATENT DOCUMENTS

| CN | 101689785 A | 3/2010 |
| CN | 201830040 U | 5/2011 |

(Continued)

OTHER PUBLICATIONS

Machine Translation of Guo, CN204967491U (Year: 2016).*

(Continued)

*Primary Examiner* — Bernard Rojas
(74) *Attorney, Agent, or Firm* — Scully, Scott, Murphy & Presser, P.C.

(57) ABSTRACT

The present application provides a brushless motor and an electrical equipment. The brushless motor includes: a casing, a stator, and a rotor. The stator includes a stator core and a winding. The rotor includes a rotor core and a shaft. Two bearings are sleeved on the shaft at positions corresponding to two ends of the rotor core, respectively. The two bearing brackets are installed at two ends of the casing. The brushless motor further includes a conductive sheet, configured for adjusting a capacitive reactance between the stator core and each of the two bearing brackets. The conductive sheet is attached to an outer circumferential surface of the casing. The conductive sheet and the stator core each at least (Continued)

partially has an area aligned to each other in a radial direction of the casing.

20 Claims, 13 Drawing Sheets

(56) References Cited

U.S. PATENT DOCUMENTS

| | | | | |
|---|---|---|---|---|
| 2011/0234026 | A1* | 9/2011 | Mizukami | H02K 11/40 |
| | | | | 310/43 |
| 2012/0025746 | A1 | 2/2012 | Kawakubo et al. | |
| 2012/0112588 | A1* | 5/2012 | Watanabe | H02K 11/40 |
| | | | | 310/90 |
| 2012/0274157 | A1 | 11/2012 | Watanabe et al. | |
| 2012/0286608 | A1 | 11/2012 | Komiyama et al. | |

FOREIGN PATENT DOCUMENTS

| | | | |
|---|---|---|---|
| CN | 102334265 | A | 1/2012 |
| CN | 102414961 | A | 4/2012 |
| CN | 102474152 | A | 5/2012 |
| CN | 102577040 | A | 7/2012 |
| CN | 102780306 | A | 11/2012 |
| CN | 102859845 | A | 1/2013 |
| CN | 103001382 | A | 3/2013 |
| CN | 103078438 | A | 5/2013 |
| CN | 103545949 | A | 1/2014 |
| CN | 203423586 | U | 2/2014 |
| CN | 103840632 | A | 6/2014 |
| CN | 203942406 | U | 11/2014 |
| CN | 104467294 | A | 3/2015 |
| CN | 104467295 | A | 3/2015 |
| CN | 105048692 | A | 11/2015 |
| CN | 204906117 | U | 12/2015 |
| CN | 204906118 | U | 12/2015 |
| CN | 204928486 | U | 12/2015 |
| CN | 204967491 | U | 1/2016 |
| CN | 107482859 | A | 12/2017 |
| CN | 108964335 | A | 12/2018 |
| CN | 109546790 | A | 3/2019 |
| CN | 208638166 | U | 3/2019 |
| CN | 107302278 | A | 10/2021 |
| EP | 2299559 | A2 | 3/2011 |
| EP | 2506406 | A1 | 10/2012 |
| EP | 2736153 | A2 | 5/2014 |
| EP | 3021461 | A2 | 5/2016 |
| EP | 3 021 461 | B1 | 5/2017 |
| JP | 2000139056 | A | 5/2000 |
| JP | 2007020348 | A | 1/2007 |
| JP | 2007120697 | A | 5/2007 |
| JP | 2013038869 | A | 2/2013 |
| JP | 2013150505 | A | 8/2013 |
| JP | 2013-207896 | A | 10/2013 |
| JP | 2019-068554 | A | 4/2019 |
| WO | 2014/101363 | A1 | 7/2014 |
| WO | 2018179832 | A1 | 10/2018 |

OTHER PUBLICATIONS

First Office Action dated Feb. 16, 2022 received in Chinese Patent Application No. CN 202110626729.X together with an English language translation.
Notice of Reasons for Refusal dated Dec. 23, 2022 received in Japanese Patent Application No. JP 2021-570207.
Notice of Reasons for Refusal dated Jun. 13, 2023 received in Japanese Patent Application No. JP 2021-570207.
International Search Report dated Apr. 30, 2020 received in International Application No. PCT/CN2019/111691.
Extended European Search Report dated May 12, 2022 received in European Patent Application No. EP 19939984.1.
First Office Action dated Jun. 25, 2021 received in Chinese Patent Application No. CN 201910684726.4.
First Office Action dated Jun. 22, 2021 received in Chinese Patent Application No. CN 201910683827.X.
Notice of Reasons for Refusal dated Nov. 7, 2023 received in Japanese Patent Application No. JP 2021-570207.
Request for the Submission of an Opinion dated Nov. 13, 2023 received in Korean Patent Application No. KR 10-2021-7038406.
Decision of Refusal dated Mar. 5, 2024 received in Japanese Patent Application No. JP 2021-570207.
Notice of Opinion for the First Review dated Mar. 23, 2024 received in Chinese Patent Application No. CN 201910684728.3.
Notice of Opinion for the First Review dated Mar. 23, 2024 received in Chinese Patent Application No. CN 201910684100.3.

* cited by examiner

BRUSHLESS MOTOR AND ELECTRICAL EQUIPMENT

CROSS-REFERENCE TO RELATED APPLICATIONS

This application is a continuation application of PCT International Application No. PCT/CN2019/111691 filed on Oct. 17, 2019, which claims priority to and benefits of Chinese Patent Application No. 201910683827.X, filed on Jul. 26, 2019, the contents of which are incorporated herein by reference for all purposes. No new matter has been introduced.

TECHNICAL FIELD

This application relates to the field of motors, and more particularly to a brushless motor and an electrical equipment adopting the brushless motor.

BACKGROUND

The statements here only provide background information related to this application, and do not necessarily constitute prior art. In recent years, due to the energy-saving trend of the electrical equipment such as air-conditioning units, high-efficiency brushless DC motors have been used to replace induction motors to drive blowers, pumps, gears, and other loads. These brushless DC motors are generally driven by inverters, which adopt a pulse width modulation (hereinafter referred to as PWM) method as a driving method. When using the PWM driving method, a common mode voltage is always generated due to the reason that the neutral point potential of the winding is not zero. In the case of high frequency, a voltage between the inner ring and outer ring of the bearing (bearing capacitor branch) is generated by the common mode voltage via a loop, which is formed by the coupling capacitors generated between various structural parts of the motor, including the stator, the rotor, the permanent magnet, the bearing bracket, and the bearing capacitors. This voltage between the inner ring and the outer ring of the bearing caused by the common mode voltage is called shaft voltage. The shaft voltage contains the high-frequency components of the high-speed switching action of the semiconductor during PWM driving. If the shaft voltage reaches the insulation breakdown voltage of the lubricating oil film inside the bearing, the current will be generated due to discharge, resulting in local erosion between the inner surface and the balls of the bearing, that is, electric corrosion (also called electric erosion) occurring inside the bearing. When the electric corrosion is aggravated, wave-shaped abrasion will occur inside the bearing, such as the inner ring, outer ring or balls of the bearing, causing abnormal noise and decrease in the service lift of the bearing.

SUMMARY

An object of embodiments of the present application is to provide a brushless motor to solve the problem in the related arts that excessively high shaft voltage of the brushless motor causes electric erosion of the bearing.

According to an aspect of the present application, a brushless motor is provided. The brushless motor comprises: a casing having an insulating property; a stator fixed within the casing; and a rotor rotatably arranged within the stator. The stator comprises a stator core and a winding wound around the stator core. The rotor comprises a rotor core and a shaft passing through the rotor core. Two bearings are sleeved on the shaft at positions corresponding to two ends of the rotor core, respectively, and two bearing brackets are installed at two ends of the casing for fixing the two bearings. The brushless motor further comprises: a conductive sheet, configured for adjusting a capacitive reactance between the stator core and each of the two bearing brackets. The conductive sheet is spaced apart from the stator core at an outer circumferential side of the stator core, and the conductive sheet is insulated from the stator core. The conductive sheet and the stator core each at least partially has an area aligned to each other in a radial direction of the stator core. The conductive sheet is in electrical connection with at least one of the two bearing brackets.

According to another aspect of the present application, an electrical equipment is provided, which includes the brushless motor as described in the above.

The embodiments of the present application have at least one of the following technical effects.

In the brushless motor of the present application, the conductive sheet is attached to the outer circumferential surface of the casing, so that the conductive sheet and the stator core each has an area aligned to each other, forming a coupling capacitor between the stator core and the conductive sheet. Moreover, the bearing brackets are located at ends of the casing, the adjusting of the equivalent capacitance between the stator core and the bearing bracket can be achieved, the potential between the outer ring and the inner ring of the bearing is therefore balanced, and the shaft voltage is reduced, thereby preventing the bearing from electric erosion.

BRIEF DESCRIPTION OF THE DRAWINGS

In order to more clearly illustrate the technical solutions in the embodiments of the present application, the drawings that need to be used in the description of the embodiments or the exemplary art will be briefly described hereinbelow. Obviously, the accompanying drawings in the following description are only some embodiments of the present application. For those skilled in the art, other drawings can be obtained based on these drawings without creative work.

Figure 1:
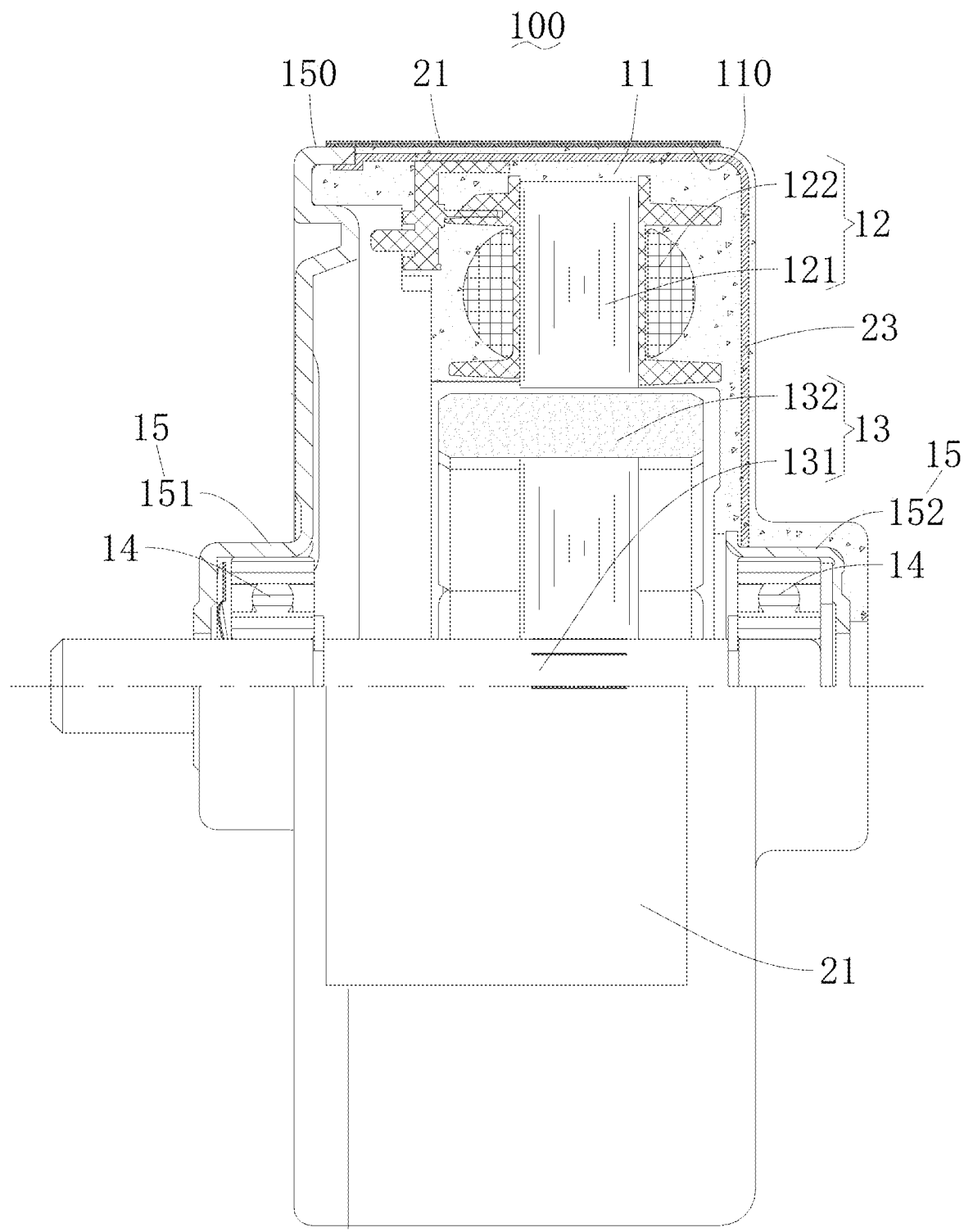
FIG. 1 is a cross sectional schematic structural view of a first brushless motor according to an embodiment of the present application.

In the drawings, the following reference numerals are adopted:

100: Brushless motor; 11: Casing; 111: Positioning groove; 12: Stator; 121: Stator core; 122: Winding; 13: Rotor; 131: Shaft; 132: Rotor core; 14: Bearing; 15: Bearing bracket; 151: First bracket; 152: Second bracket; 21: Conductive sheet; 22: Conductive arm; 23: Conductive piece; 24: Dielectric layer; 90: Oscilloscope; and 91: Differential probe.

DETAILED DESCRIPTION OF EMBODIMENTS

In order to make the purposes, technical solutions, and advantages of the present application clearer and more understandable, the present application will be further described in detail hereinafter with reference to the accompanying drawings and embodiments. It should be understood that the embodiments described herein are only intended to illustrate but not to limit the present application.

It should be noted that when an element is described as "fixed" or "arranged" on/at another element, it means that the element can be directly or indirectly fixed or arranged on/at another element. When an element is described as "connected" to/with another element, it means that the element can be directly or indirectly connected to/with another element. Moreover, terms like "first" and "second" are only used for the purpose of description, and will in no way be interpreted as indication or hint of relative importance or implicitly indicate the number of the referred technical features. Thus, the features prefixed by "first" and "second" will explicitly or implicitly represent that one or more of the referred technical features are included. In the description of the present application, "multiple"/"a plurality of" refers to the number of two or more than two, unless otherwise clearly and specifically defined. The meaning of "several" is one or more than one, unless otherwise specifically defined. It should be understood that terms "center", "length", "width", "thickness", "upper", "lower", "front", "rear", "left", "right", "vertical", "horizontal", "top", "bottom", "inside", "outside" and the like indicating orientation or positional relationship are based on the orientation or the positional relationship shown in the drawings, and are merely for facilitating and simplifying the description of the present application, rather than indicating or implying that a device or component must have a particular orientation, or be configured or operated in a particular orientation, and thus should not be construed as limiting the application. In the present application, unless otherwise specifically stipulated and defined, terms like "install", "connect", "couple", "fix" should be construed broadly, for example, they may indicate a fixed connection, a detachable connection, or an integral as a whole; may be a mechanical connection, or an electrical connection; may be in direct connection, or indirect connection via an intermediate, and may also reflect internal communication of two elements or interactions between two elements. For those skilled in the art, the specific meanings of the above terms in the present application can be understood according to specific conditions.

A brushless motor 100 provided by the present application is described hereinbelow with reference to FIG. 1. The brushless motor 100 comprises: a casing 11, a stator 12, a rotor 13, two bearings 14, and two bearing brackets 15. Both the stator 12 and the rotor 13 are installed in the casing 11, and the stator 12 is configured to drive the rotor 13 to rotate. The two bearings 14 are installed at the rotor 13 to support the rotor 13. The two bearing brackets 15 support the two bearings 14, respectively, thereby supporting the rotor 13. The two bearing brackets 15 are installed at two ends of the casing 11, respectively, so as to support the rotor 13 within the casing 11 and enabling the rotor 13 to flexibly rotate. The use of the bearing brackets 15 to support the bearings 14 can achieve more stable supporting of the bearings 14, thereby ensuring excellent rotation of the bearings 14.

The casing 11 has insulating property, and plays the main role of support and protection. The casing 11 can be injection-molded using a resin material, which can facilitate processing and manufacture, and can have satisfactory insulation effect. In addition, the casing 11 can also dissipate heat. It can be understood that in order to improve the heat dissipation efficiency, one or more heat dissipation fins can be arranged on the casing 11.

The stator 12 comprises a stator core 121 and a winding 122. The winding 122 is wound on the stator core 121. When a current passes through the winding 122, a magnetic field is generated, and the magnetic field is reinforced and guided by the stator core 121. The stator core 121 is formed by stacking a plurality of the silicon steel sheets to reduce eddy currents. The stator core 121 generally comprises a plurality of tooth-like structures, and the winding 122 is wound on the respective teeth. These tooth-like structures are enclosed to form a circular shape, which enables the rotor to be arranged within the stator 12 and to be driven to rotate.

The rotor 13 comprises: a shaft 131 and a rotor core 132. The shaft 131 passes through a center of the rotor core 132, such that the rotor core 132 can be supported by the shaft 131; and the rotor core 132 is placed in the stator 12. Therefore, when the winding 122 is energized, an alternating magnetic field is generated on the stator core 121 to drive the rotor core 132 to rotate and in turn drive the shaft 131 to rotate. In addition, the rotor core 132 may be a combined structure of the rotor core 132 and magnets, or may be formed by punching the silicon steel sheets into a cage-like shape by a punching machine, and stacking punched silicon steel sheets, casting with aluminum for processing.

Both the two bearings 14 are sleeved outside the shaft 131, and are located at the two ends of the rotor core 132, respectively. Since the weight of the rotor 13 is mostly concentrated at the position of the rotor core 132, the center of gravity of the rotor 13 is also at the position corresponding to the rotor core 132. Such an arrangement of the two bearings 14 at the two ends of the rotor core 132 respectively can better support the shaft 131, and in turn support the rotor core 132, which makes the rotor core 132 and the shaft 131 rotate more stably. The arrangement of the two bearings 14 for supporting the shaft 131 enables the rotation of the shaft 131 more flexibly.

Two bearings 14 are arranged within the two bearing brackets 15, respectively, such that the two bearings 14 and in turn the rotor 33 are supported by corresponding bearing brackets 15. The two bearing brackets 15 are respectively installed at two ends of the casing 11 to support the rotor 13 in the casing 11 and enable the rotor 13 to rotate flexibly in the casing 11. Moreover, the stator core 121 is insulated from the respective bearing brackets 15. The use of the two bearing brackets 15 can support the bearings 14 more stably and ensure the smooth rotation between the outer ring and the inner ring of each bearing 14, and can also reduce vibration and avoid the bearings 14 from creeping. The outer rings of the bearings 14 are in electrical connection to the bearing brackets 15, respectively. The "electrical connection" means the ability to conduct electricity, but is not limited to that the current always passing through the outer ring of the bearing 14 and the corresponding bearing bracket 15. For example, the "electrical connection" may refer to a contact state between a metal bearing bracket and a metal outer ring of the corresponding bearing.

As shown in FIG. 1, in an embodiment, the stator 12 and the casing 11 are plastic packaged into an integrated structure, so that the stator 12 is firmly and stably fixed in the casing 11. The casing 11 can be manufactured to have a relatively small size, thereby reducing the volume and the weight of the manufactured brushless motor 100. For example, when the casing 11 is made by injection molding, the stator 12 can be placed in a mold, so that when the casing 11 is injection molded, the casing 11 and the stator 12 form an integrated structure. It can be understood that, in some other embodiments, the casing 11 can also be made separately, and the stator 12 can be fixed in the casing 11.

As shown in FIG. 1, in an embodiment, the two bearing brackets 15 comprise a first bracket 151 and the second bracket 152. The first bracket 151 and the second bracket 152 are located at the two ends of the casing 11, respectively. The first bracket 151 is used as an end cover of the casing 11, and the second bracket 152 and the casing 11 are molded into an integral structure, that is, when the casing 11 is injection molded, the second bracket 152 can be placed in the mold, such that the second bracket 152 and the casing 11 can be injection molded as a whole during the injection molding of the casing 11. In this way, the second bracket 152 is firmly fixed in the casing 11, which facilitates the processing and manufacture and reduces the weight and the cost. The use of the first bracket 151 as the end cover of the casing 11 enables the whole end cover to be made of a metal, or only a part of the end cover that supports the bearing 14 to be made of the metal, thereby preventing the bearing 14 from creeping and ensuring stable rotation of the bearing 14. The second bracket 152 may be a part only supporting the corresponding bearing 14, so that the second bracket 152 and the casing 11 can be easily molded into an integral structure during injection molding.

Figure 9:
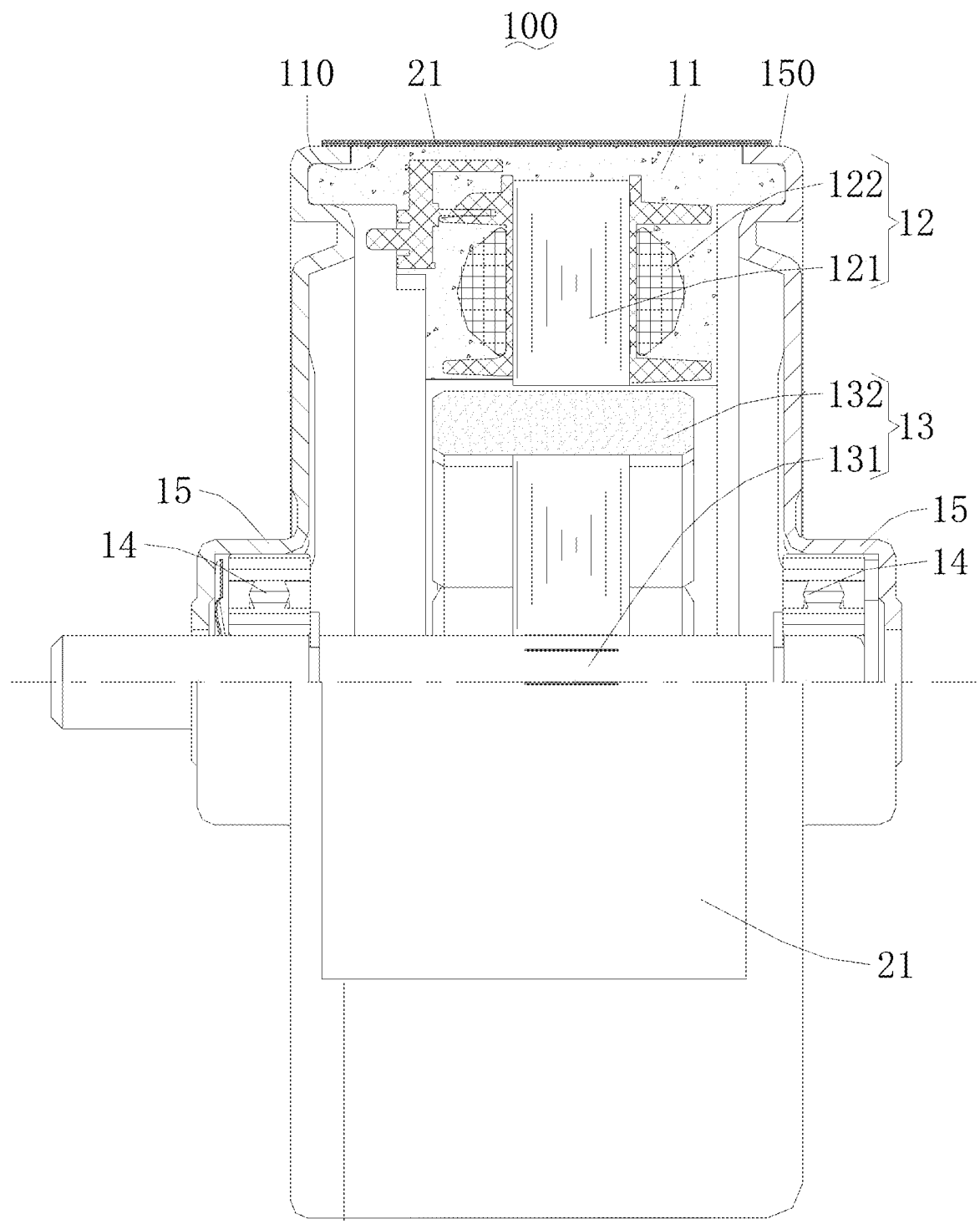
FIG. 9 is a cross sectional schematic structural view of an eighth brushless motor according to an embodiment of the present application.

As shown in FIG. 9, in an embodiment, both the two ends of the casing 11 may be configured to be open structures, and both the two bearing brackets 15 may be used as two end covers, such that a fan and other structures can be installed in one end of the casing 11 to further enhance heat dissipation. It can be understood that such a structure has more practical significance for motors that require output at both ends of the shaft 131. In addition, the configuration of two ends of the casing 11 as the open structures and the two bearing brackets 15 as end covers may increase the strength of the whole brushless motor 100 via the bearing bracket 15. In addition, the bearing bracket 15 can also be used for heat dissipation, in order to improve heat dissipation efficiency.

As shown in FIG. 1, in an embodiment, the brushless motor 100 further comprises: a conductive sheet 21, configured for adjusting a capacitive reactance between the stator core 121 and each of the two bearing brackets 15. The conductive sheet 21 is attached to the outer circumferential surface 110 of the casing 11. The conductive sheet 21 and the stator core 121 each at least partially has an area aligned to each other, so as to form a capacitor between the conductive sheet 21 and the stator core 121. The conductive sheet 21 is connected to at least one of the two bearing brackets, which is equivalent to connecting a coupling capacitor in parallel to the original capacitor formed between each of the bearing brackets and the stator core. By changing the size of the conductive sheet 21, the area of the conductive sheet 21 aligned to the stator core 121 can be adjusted, such that the capacitive reactance between the stator core 121 and each bearing bracket 15 can be adjusted, that is, the capacitive reactance between the stator core and the outer ring of each bearing can be adjusted. In this way, an equivalent capacitance between the stator core 121 and the inner ring of each bearing 14 is approximate to or equal to an equivalent capacitance between the stator core 121 and the outer ring of each bearing 14. In other words, the equivalent capacitance between the stator core 121 and the inner ring of each bearing 14 and the equivalent capacitance between the stator core 121 and the outer ring of each bearing 14 are balanced, and in turn, the potential between the outer ring of each bearing 14 and the inner ring of each bearing 14 are balanced. As a result, the potential of the outer ring of each bearing 14 and the potential of the inner ring of each bearing 14 are similar, and a potential difference between the outer ring of each bearing 14 and the inner ring of each bearing 14 are reduced, thereby decreasing a shaft voltage and avoid the bearing 14 from electric erosion.

In some other embodiments, the conductive sheet 21 can be arranged within the casing 11, in which case the distance between the conductive sheet 21 and the stator core 121 is reduced. That is, it is only required that the conductive sheet 21 is spaced apart from the stator core 121 at an outer circumferential side of the stator core 121, and the conductive sheet 21 is insulated from the stator core 121.

Furthermore, in the above embodiment, the two bearing brackets 15 are in electrical connection, so that the potentials of the two bearing brackets 15 are kept consistent, and the potentials of the outer rings of the two the bearing 14 are kept consistent. In the above embodiment, the first bracket 151 and the second bracket 152 are electrically connected, so that the first bracket 151 and the second bracket 152 have the same potential. In this way, the capacitive reactance between the stator core 121 and each of the two bearing brackets 15 can be adjusted synchronously by the conductive sheet 21, which adjustment is more convenient. In some other embodiments, in case that the structures of the two bearing brackets 15 are different, the potential differences between the inner rings and the outer rings of the two bearings 14 are also different, and the conductive sheet 21 can be electrically connected to only one of the bearing brackets 15, so that only the capacitive reactance between said one of the bearing brackets 15 and the stator core 121 is adjusted.

Furthermore, in the above embodiment, the conductive piece 23 may be arranged within the casing 11 to electrically connect the two bearing brackets 15. It can be understood that the conductive piece 23 can also be attached from the outside of the casing 11 to electrically connect the two bearing brackets 15. Specifically, the conductive piece 23 may be an elongated metal sheet, a metal wire, a conductive tape, or the like.

Furthermore, in the above embodiment, a circumferential side 150 of the first bracket 151 extends to an outer circumferential surface 110 of the casing 11. The conductive sheet 21 is attached to the circumferential side 150 of the first bracket 151. In this way, the electricity of the first bracket 151 and the second bracket 152 is introduced to the conductive sheet 21, and as a capacitor is formed between the conductive sheet 21 and the stator core 121, each of the two bearing brackets 15 and the stator core 121 form capacitive connection. By adjusting the size of the conductive sheet 21, the equivalent capacitance between the stator core 121 and each of the bearing brackets 15 is adjusted, thereby reducing the potential difference between the inner ring and outer ring of the respective bearings 14, so as to reduce the shaft voltage and avoid the bearings 14 from electric erosion.

Furthermore, in the above embodiment, one conductive sheet 21 is arranged on the casing 11. By adjusting the size of the conductive sheet 21, the capacitance is adjusted. The use of one conductive sheet 21 is convenient for installation.

Furthermore, in the above embodiment, the conductive sheet 21 is spaced apart from the stator core 121, and a distance between the conductive sheet 21 and the outer circumferential surface of the stator core 121 is smaller than or equal to 5 mm. Since the casing 11 has insulating property, the distance between the conductive sheet 21 and the outer circumferential surface of the stator core 121 is arranged to be smaller than or equal to 5 mm, such that sufficient capacitance can be reached between the conductive sheet 21 and the stator core 121, meanwhile, the area of the conductive sheet 21 can be reduced, which is convenient for the installation and use of the conductive sheet 21. When the distance between the conductive sheet 21 and the outer circumferential surface of the stator core 121 is too large, a relatively small capacitance between the conductive sheet 21 and the stator core 121 is resulted, and if a large enough coupling capacitance is to be obtained, the area needs to be increased In some embodiments, an accommodation groove can be defined in the outer circumferential surface 110 of the casing 11 to install the conductive sheet 21, thereby reducing the distance between the conductive sheet 21 and the stator core 121. It can be understood that the arrangement of the accommodation groove can also function in positioning the conductive sheet 21. It can also be understood that when the size of the conductive sheet 21 is adjusted, a partial area of the conductive sheet 21 can also be extended beyond the accommodation groove. That is, the outer circumferential surface 110 of the casing 11 defines therein an accommodation groove, and the conductive sheet 21 is at least partially accommodated in the accommodation groove.

Furthermore, in an embodiment, an outer circumferential area of the stator core 121, that is, an area of the outer circumferential surface of the stator core 121 is defined as S, the area of each of the conductive sheet 21 and the stator core 121 aligned to each other in the radial direction of the stator core 121 is defined as S1, and S1≥S/N, where N is a number of teeth of the stator. Based on a large number of experiments of the applicant, it is found that the area of each of the conductive sheet 21 and the stator core 121 aligned to each other in the radial direction of the stator core 121, the area of the outer circumferential surface of the stator core 121, and the teeth number N of the stator core 121 satisfy S1≥S/N. In case that S1 is less than S/N, it is found in the experiments that the conductive sheet 21 cannot significantly adjust the capacitance between the stator core 121 and the bearing brackets 15, and the shaft voltage only drops slightly, which cannot meet the requirements.

Furthermore, in the above embodiment, N≥12, the area of each of the conductive sheet 21 and the stator core 121 aligned to each other in the radial direction of the stator core 121 is no smaller than 1/12 of the outer circumferential area of the stator core 121. Configuring N to be greater than or equal to 12 can enable the stator 12 of the brushless motor 100 to better drive the rotor 13 to rotate, facilitating more precise adjustment. It can be understood that, in some embodiments, N can also be configured to be less than 12, such as the number of teeth of the stator core 121 is 6, 8, 10, or the like. The width of the conductive sheet 21 extending in the circumferential direction of the stator 12 is not less than 1/12 of the circumference of the outer circumferential surface of the stator core 121, which can achieve a significant reduction in the shaft voltage.

As shown in FIG. 1, in an embodiment, the capacitance between the conductive sheet 21 and the stator core 121 is 10-100 PF, which ensures good adjustment of the capacitance between each of the bearing brackets 15 and the stator core 121 and in turn a good adjustment of the potential difference between the inner ring and the outer ring of each bearing 14. In case that the capacitance between the conductive sheet 21 and the stator core 121 is less than 10 PF, the effect of adjusting the potential difference between the inner ring and the outer ring of each bearing 14 is poor. When the capacitance between the conductive sheet 21 and the stator core 121 is greater than 100 PF, the potential reverse difference between the inner ring and the outer ring of each bearing 14 is greater, that is, the potential difference between the inner ring and the outer ring of each bearing 14 is still greater.

As shown in FIG. 1, in an embodiment, one side of the conductive sheet 21 is an adhesive side having a conductive property, so that the conductive sheet 21 can be easily adhered on the outer circumferential surface 110 of the casing 11, which is convenient to use. The other side of the conductive sheet 21 is an insulating side having an insulating property, which can reduce the influence of external devices on the conductive sheet 21 and make the conductive sheet 21 more stable to adjust the capacitive reactance between the stator core 121 and each of the two bearing brackets 15.

As shown in FIG. 1, in an embodiment, one side of the conductive sheet 21 away from the casing 11 is printed with a logo, thus, the conductive sheet 21 may also use as a brand name of the brushless motor 100.

As shown in FIG. 1, in an embodiment, the conductive sheet 21 is a conductive paper, thereby being convenient to be attached to the casing 11 as well as to be cut to adjust the size thereof. It should be understood that in some embodiments, the conductive sheet 21 is a metal foil, for example, a copper foil, an aluminum foil, and the like may be adopted.

It can be understood that in some other embodiments, the conductive sheet 21 may also be a conductive coating. The conductive coating is applied on the outer circumferential surface 110 of the casing 11 to form the conductive sheet 21, thereby ensuring that the conductive sheet 21 is firmly fixed on the casing 11. The conductive coating can be made of a conductive glue, a conductive paste, and other materials. Furthermore, the conductive coating can be applied on the casing 11 by spraying, coating, or printing, which facilitates the arrangement of the conductive coating.

Figure 10:
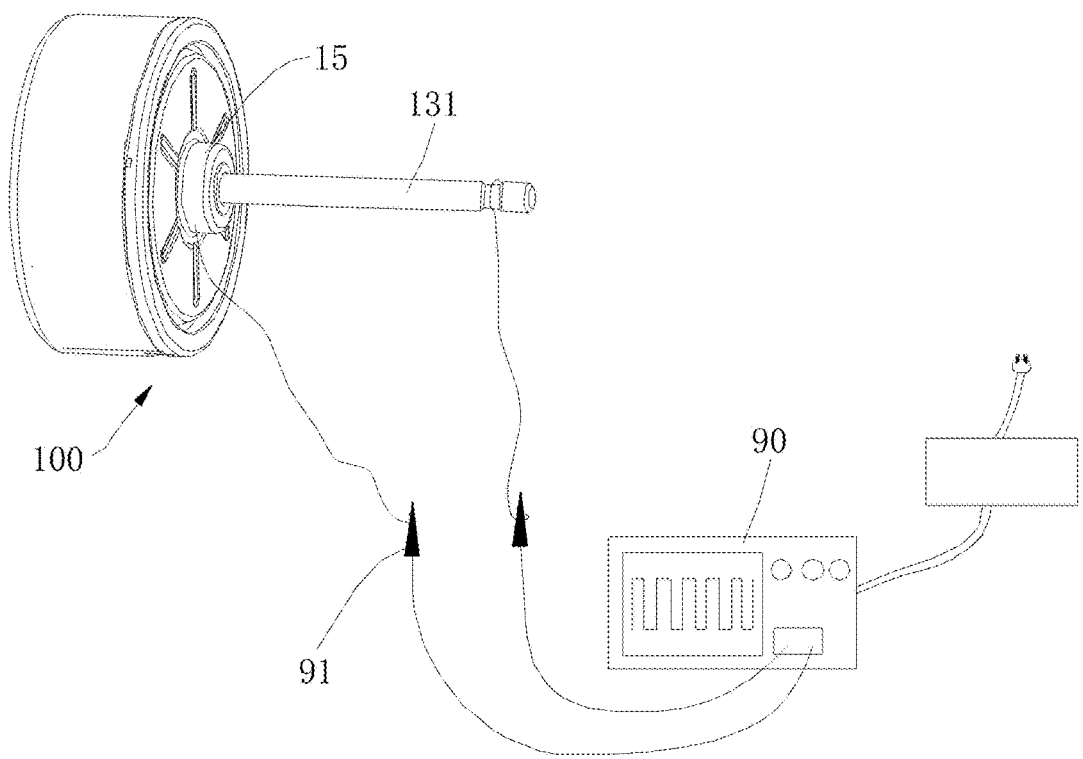
FIG. 10 is a schematic structural view of shaft voltage detection according to an embodiment of the application.

Furthermore, as shown in FIG. 10, in order to better describe the effect of the use of the conductive sheet 21 in the brushless motor 100 in this embodiment to reduce the shaft voltage, the following comparison experiment was further performed:

In specific examples, a piece of aluminum foil having a glue on the surface is used as the conductive sheet 21, and is adhered to the outer circumferential surface of the casing 11; and an edge of one side of the conductive sheet 21 is adhered to the circumferential side 150 of the first bracket 151, such that the conductive sheet 21 and the first bracket 151 are directly connected in a conducting state. During specific implementations, for each motor of different schemes, the conductive sheet 21 having different areas can be adhered to the outer circumferential surface of the casing 11 in advance, by testing the variation of the shaft voltage, the area and corresponding adhering position of the conductive sheet 21 in the case of relatively low shaft voltage are acquired, thus the technical scheme for improving the shaft voltage of the corresponding motor is obtained, which can be applied to mass production. Comparison of the test results of the shaft voltage of the same brushless motor 100 using different conductive sheets and without using the conductive sheet 21 is listed in Table 1. It can be seen from the results that by adjusting the conductive sheet 21, the shaft voltage significantly changes and exhibits excellent regularity, and thus the shaft voltage can be effectively controlled. The distance between the conductive sheet 21 and the outer circumferential side of the stator core 121 is 5 mm.

other in the area aligned to the stator core. In particular, the area of each of the first conductive sheet and the stator core 121 aligned to each other in the radial direction of the stator core 121 was ⅛ of the outer circumferential area of the stator core 121. The area of each of the second conductive sheet and the stator core 121 aligned to each other in the radial direction of the stator core 121 was ¼ of the outer circumferential area of the stator core 121. The area of each of the third conductive sheet and the stator core 121 aligned to each other in the radial direction of the stator core 121 was ⅜ of the outer circumferential area of the stator core 121. The area of each of the fourth conductive sheet and the stator core 121 aligned to each other in the radial direction of the stator core 121 was ½ of the outer circumferential area of the stator core 121. The area of each of the fifth conductive sheet and the stator core 121 aligned to each other in the radial direction of the stator core 121 was ⅝ of the outer circumferential area of the stator core 121.

Figure 11:
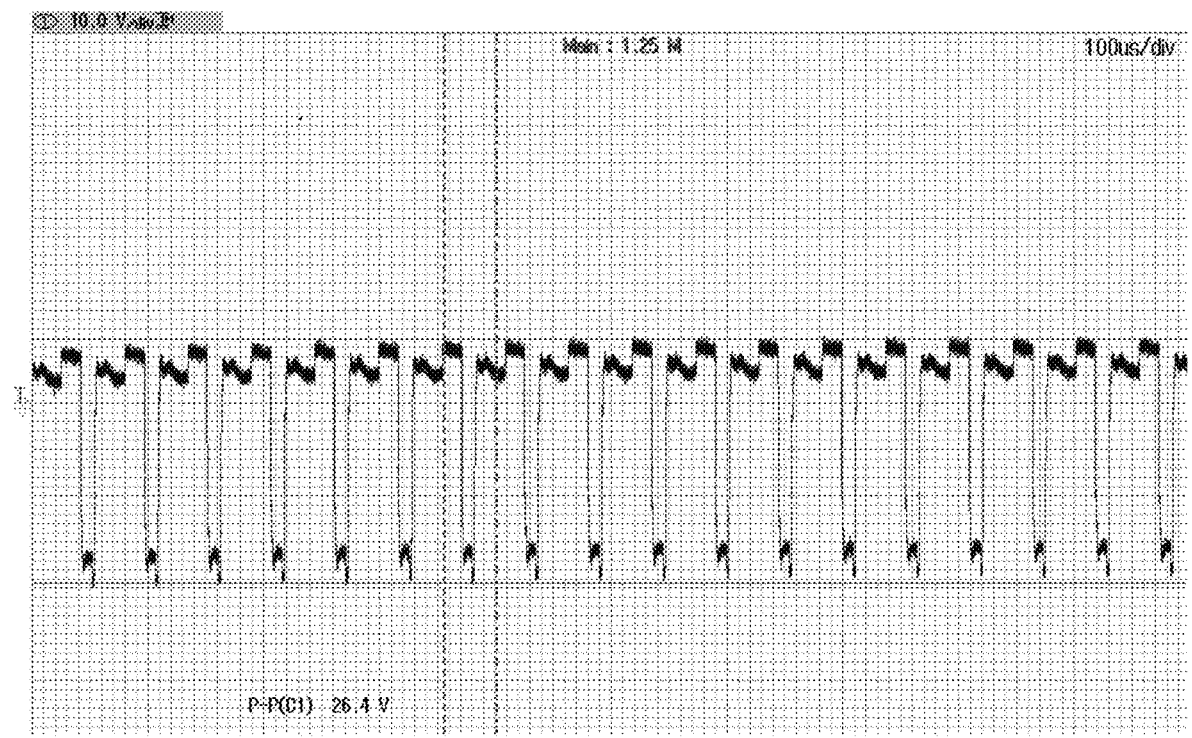
FIG. 11 is a measured waveform of a shaft voltage of a comparative example according to an embodiment of the present application.

FIG. 11 is a measured waveform of the shaft voltage when no conductive sheet is adopted in the corresponding brushless motor in the comparative example. In the figure, "Main: 1.25 m" refers to that the time base is 1.25 min, and P-P(C1) refers to the shaft voltage, a scan speed as indicated in a horizontal axis in the figure is 100 μs/div, a voltage sensitivity as indicated in a vertical axis is 10 V/div, and the waveform illustrates the variation of the shaft voltage over time. The shaft voltage of the brushless motor measured from the waveform is 26.4 V.

Figure 12:
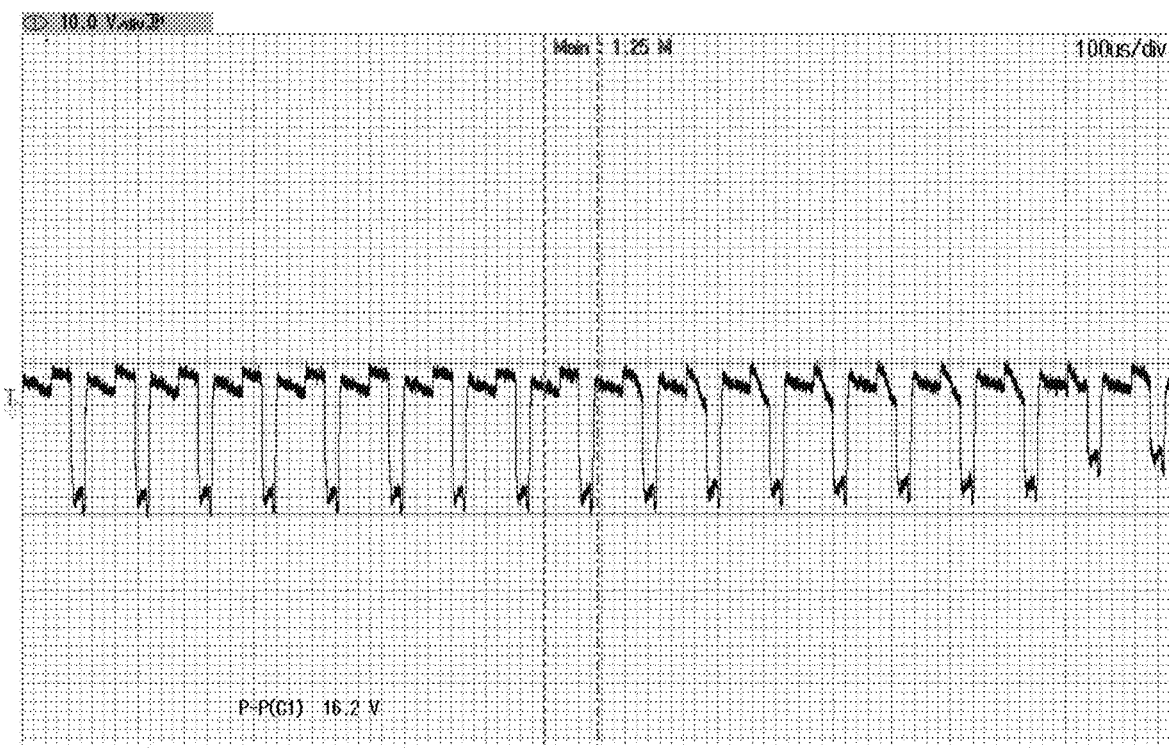
FIG. 12 is a measured waveform of a shaft voltage of a first example according to an embodiment of the present application.

FIG. 12 is a measured waveform of the shaft voltage when the first conductive sheet is adopted in the brushless motor. In the figure, "Main: 1.25 m" refers to that the time base is

TABLE 1

| | Comparative example | Example 1 | | | | |
|---|---|---|---|---|---|---|
| | Without conductive sheet | First conductive sheet | Second conductive sheet | Third conductive sheet | Fourth conductive sheet | Fifth conductive sheet |
| Amplitude of shaft voltage (V) | 26.4 | 16.2 | 4.9 | 6.1 | 8.6 | 13.6 |

The above Table 1 adopts the shaft voltage measurement method shown in FIG. 10. A DC stabilized power supply was utilized to supply power to the brushless motor 100. The stator of the brushless motor 100 used in the experiment had 12 teeth, and the measurement was carried out under the same working conditions, that is, a power supply voltage Vm of the wind was DC 400 V, the control voltage Vcc of driving current of the motor was controlled to be DC 15 V, and the rotational speed of the motor was set to 1000 rpm by adjusting a speed adjusting voltage Vsp. The shaft voltage was measured using a digital the oscilloscope 90 and a differential probe 91. The two ends of the differential probe 91 were respectively connected to the shaft 131 and the corresponding bearing bracket 15 of the brushless motor 100 via a metal wire. During the test, in order to prevent the wave of the shaft voltage from being unstable due to the discontinuous of the grease lubrication of the bearing 14 which is caused by the accidental disturbance during the operation of the brushless motor 100 and other factors, the brushless motor 100 utilized in the experiment was equipped with ceramic ball bearings 14. The first to fifth conductive sheets had the same gap of 2 mm from the stator core 121 in the radial direction of the motor, but were different from each 1.25 min, and P-P(C1) refers to the shaft voltage, a scan speed as indicated in a horizontal axis in the figure is 100 μs/div, a voltage sensitivity as indicated in a vertical axis is 10 V/div, and the waveform illustrates the variation of the shaft voltage over time. The shaft voltage of the brushless motor measured from the waveform is 16.2 V.

Figure 13:
FIG. 13 is a measured waveform of a shaft voltage of a second example according to an embodiment of the present application.

FIG. 13 is a measured waveform of the shaft voltage when the second conductive sheet is adopted in the brushless motor. In the figure, "Main: 1.25 m" refers to that the time base is 1.25 min, and P-P(C1) refers to the shaft voltage, a scan speed as indicated in a horizontal axis in the figure is 100 μs/div, a voltage sensitivity as indicated in a vertical axis is 10 V/div, and the waveform illustrates the variation of the shaft voltage over time. The shaft voltage of the brushless motor measured from the waveform is 4.9 V.

Figure 14:
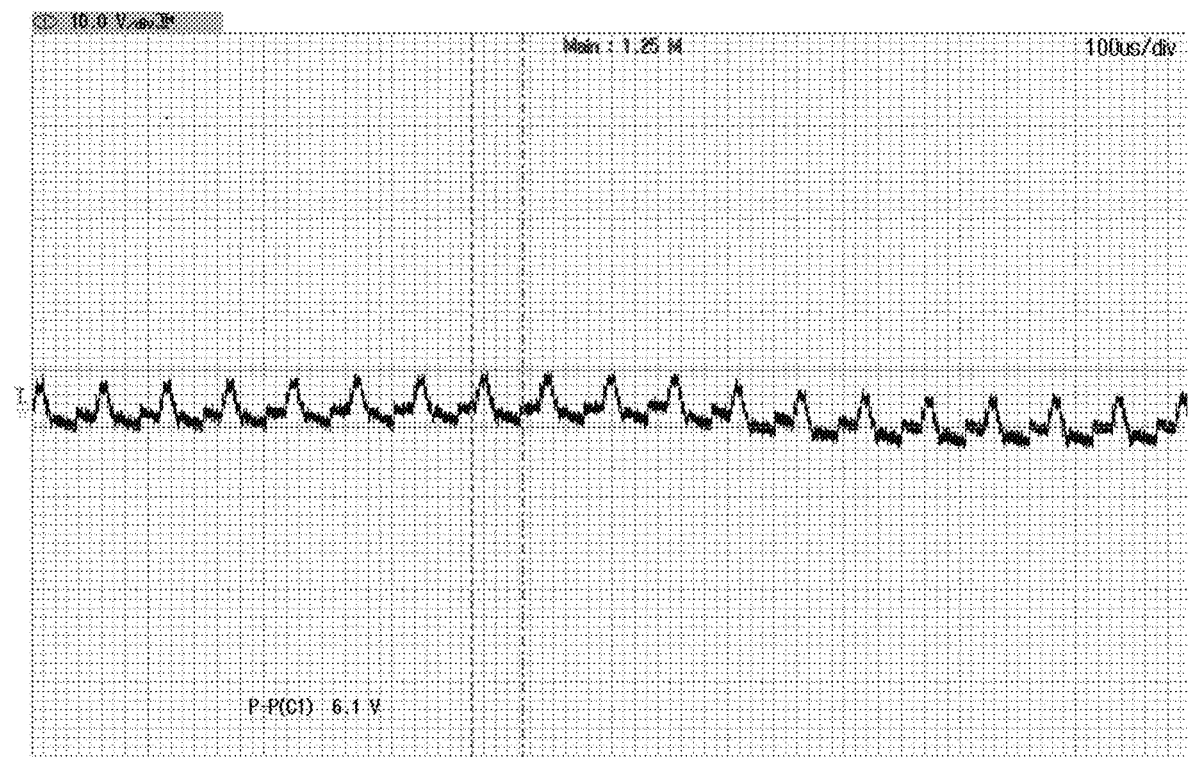
FIG. 14 is a measured waveform of a shaft voltage of a third example according to an embodiment of the present application.

FIG. 14 is a measured waveform of the shaft voltage when the third conductive sheet is adopted in the brushless motor. In the figure, "Main: 1.25 m" refers to that the time base is 1.25 min, and P-P(C1) refers to the shaft voltage, a scan speed as indicated in a horizontal axis in the figure is 100 μs/div, a voltage sensitivity as indicated in a vertical axis is 10 V/div, and the waveform illustrates the variation of the shaft voltage over time. The shaft voltage of the brushless motor measured from the waveform is 6.1 V.

Figure 15:
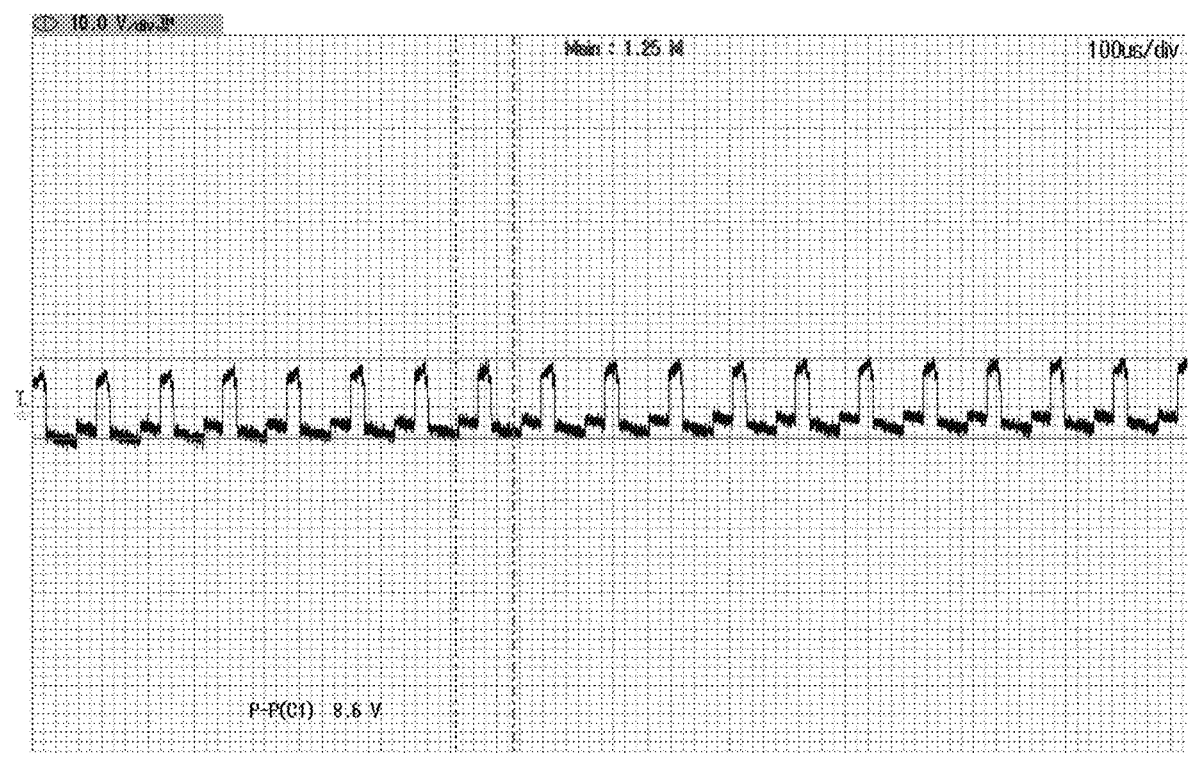
FIG. 15 is a measured waveform of a shaft voltage of a fourth example according to an embodiment of the present application.

FIG. 15 is a measured waveform of the shaft voltage when the fourth conductive sheet is adopted in the brushless motor. In the figure, "Main: 1.25 m" refers to that the time base is 1.25 min, and P-P(C1) refers to the shaft voltage, a scan speed as indicated in a horizontal axis in the figure is 100 μs/div, a voltage sensitivity as indicated in a vertical axis is 10 V/div, and the waveform illustrates the variation of the shaft voltage over time. The shaft voltage of the brushless motor measured from the waveform is 8.6 V.

Figure 16:
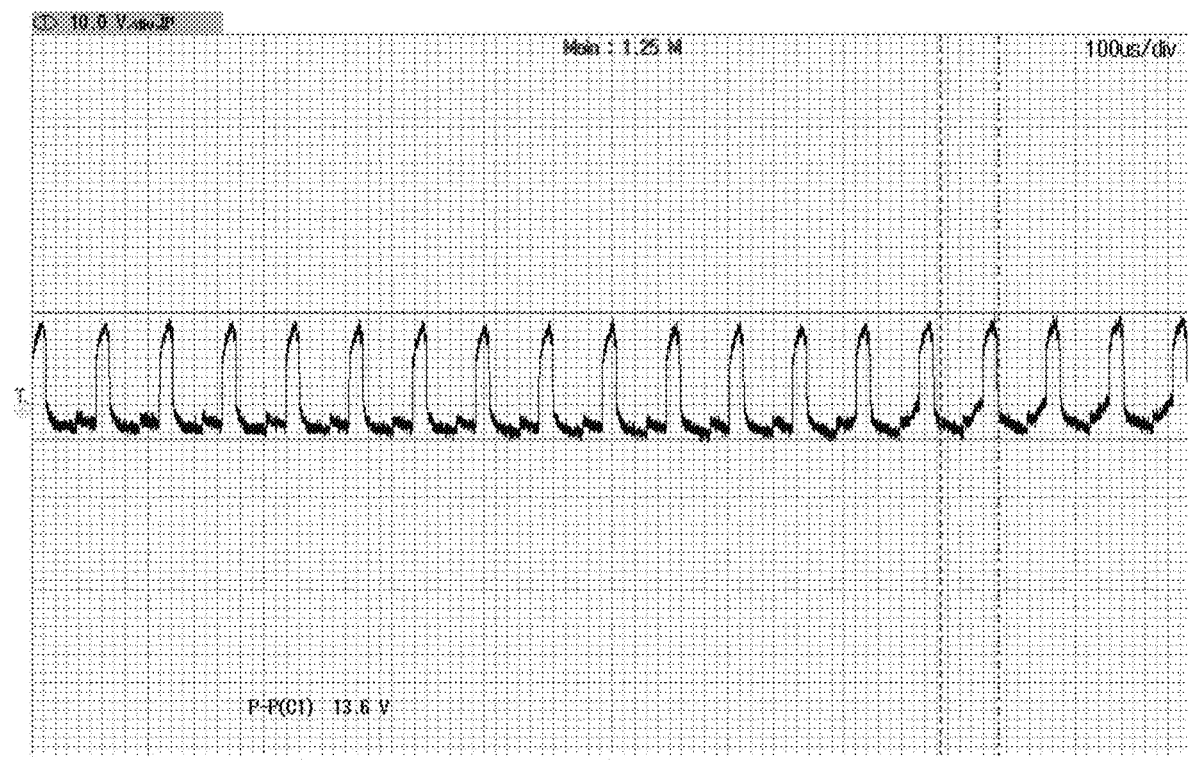
FIG. 16 is a measured waveform of a shaft voltage of a fifth example according to an embodiment of the present application.

FIG. 16 is a measured waveform of the shaft voltage when the fifth conductive sheet is adopted in the brushless motor. In the figure, "Main: 1.25 m" refers to that the time base is 1.25 min, and P-P(C1) refers to the shaft voltage, a scan speed as indicated in a horizontal axis in the figure is 100 μs/div, a voltage sensitivity as indicated in a vertical axis is 10 V/div, and the waveform illustrates the variation of the shaft voltage over time. The shaft voltage of the brushless motor measured from the waveform is 13.6 V.

Figure 2:
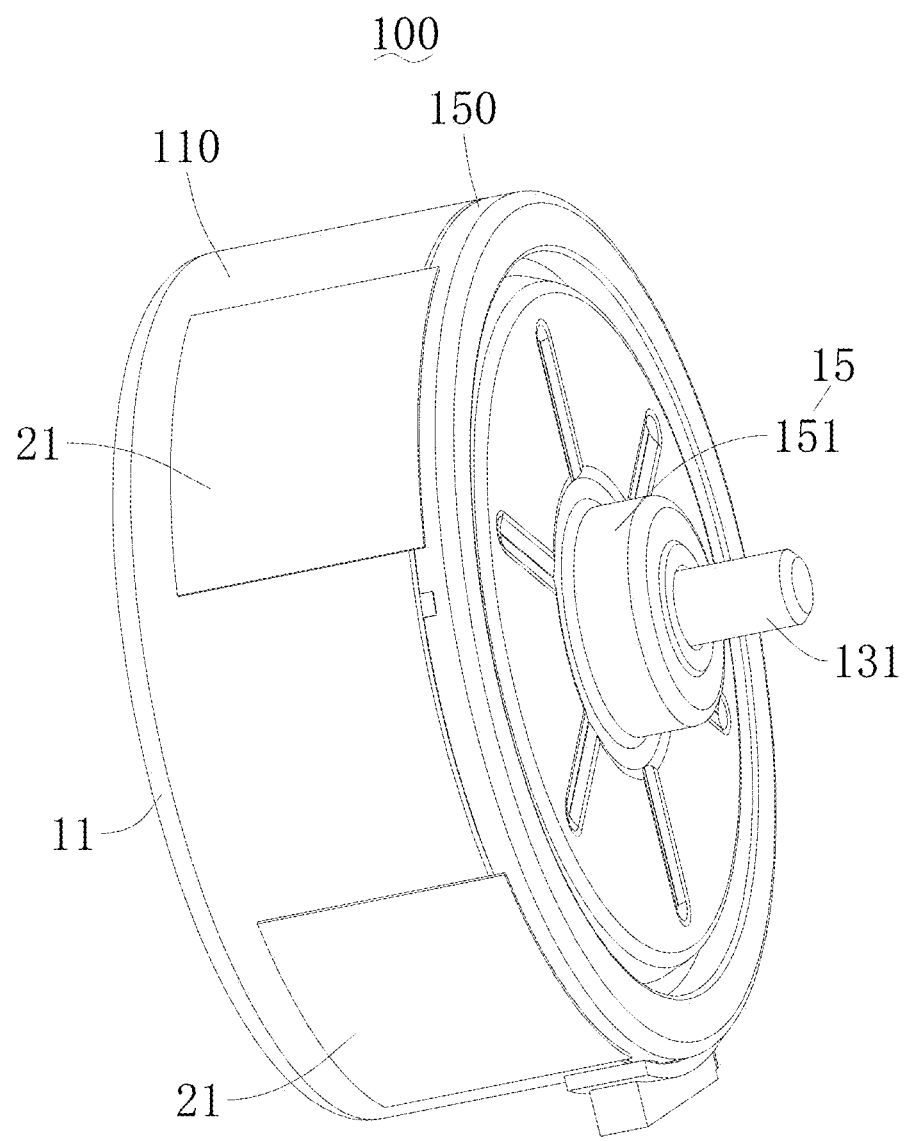
FIG. 2 is a schematic structural view of a second brushless motor according to an embodiment of the present application.

As shown in FIG. 2, in an embodiment, a plurality of conductive sheets 21 can be arranged on the casing, and each of the plurality of conductive sheets 21 is in electrical connection with the bearing brackets 15. The arrangement of the plurality of conductive sheets 21 can better adjust the sizes of the conductive sheets 21, so as to adjust the area of each of the conductive sheet 21 and the stator core 121 aligned to each other, and in turn adjust the capacitive reactance between each conductive sheet 21 and the stator core 121, the adjusting of which is convenient.

Furthermore, in the above embodiment, all the plurality of conductive sheets 21 can be in electrical connection with the two bearing brackets 15, which is convenient for adjusting the equivalent capacitance between the stator core 121 and each of the two bearing brackets 15, and in turn to adjust the potential difference between the inner ring and the outer ring of each bearing 14, thereby decreasing the shaft voltage. It can be understood that, in an embodiment, the casing 11 can be provided with only one conductive sheet 21, and both the bearing brackets 15 are in electrical connection with the one conductive sheet 21, such that the capacitive reactance between the stator core 121 and each of the two bearing brackets 15 can be adjusted by the one conductive sheet 21.

Furthermore, in the above embodiment, the electrical connection of the conductive sheet 21 with the two bearing brackets 15 can be achieved as follows: a conductive piece 23 can be arranged within the casing 11 for electrically connecting the two bearing brackets 15, and the conductive sheet 21 is electrically connected to one of the bearing brackets 15, such that the conductive sheet 21 is electrically connected with the two bearing brackets 15.

Furthermore, in the above embodiment, the circumferential side 150 of one of the two bearing brackets 15 extends to the outer circumferential surface 110 of the casing 11. During the arrangement of the conductive sheet 21, the conductive sheet 21 can be directly attached to the circumferential side 150 of the one of the bearing brackets 15, such that the conductive sheet 21 is electrically connected to the one of the bearing brackets 15, and to the other one of the bearing brackets 15 via the conductive piece 23 arranged within the casing 11. Specifically, the two bearing brackets 15 are composed of the first bracket 151 and the second bracket 152, the first bracket 151 and the second bracket 152 are connected via the conductive piece 23, and the circumferential side 150 of the first bracket 151 extends to the outer circumferential surface 110 of the casing 11. When the conductive sheet 21 is installed, the conductive sheet 21 is attached to circumferential side of the first bracket 151.

It should be understood that, in some embodiments, the conductive piece 23 can also be arranged within the casing 11 to electrically connect the two bearing brackets 15, the conductive sheet 21 is attached to the outer circumferential surface 110 of the casing 11, a conductive arm 22 is arranged on the outer circumferential surface 110 of the casing 11, and the conductive arm 22 is electrically connected to one or both of the two bearing brackets 15.

Figure 3:
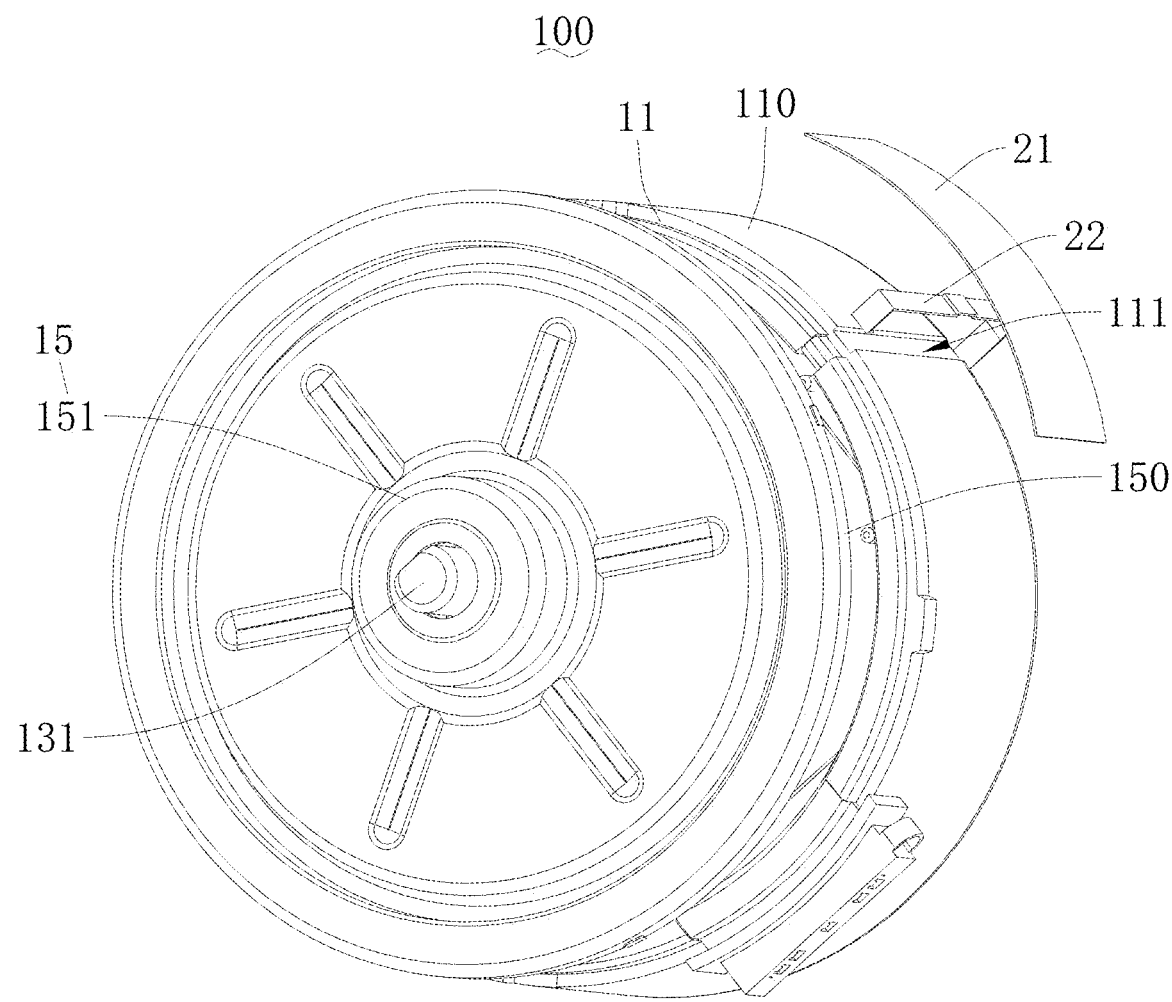
FIG. 3 is a partially exploded schematic structural view of a third brushless motor according to an embodiment of the present application.

As shown in FIG. 3, in an embodiment, the conductive arm 22 may be provided on the casing 11 to connect the two bearing brackets 15, and a part of the conductive arm 22 exposes out of the outer circumferential surface 110 of the casing 11. Therefore, during the installation of the conductive sheet 21, the conductive sheet 21 can be attached to the conductive arm 22, so as to electrically connect the conductive sheet 21 with the two bearing brackets 15. Specifically, the conductive arm 22 may be made of a metal strip, a metal wire, or a metal tape. It can be understood that, in some embodiments, the conductive arm 22 may also be a structure such as the conductive coating.

Furthermore, in the above embodiment, the conductive arm 22 may be electrically connected to the corresponding bearing bracket 15 by bonding, riveting, abutting, welding, and the like.

Furthermore, in the above embodiment, the casing 11 defines therein a positioning groove 111, and the conductive arm 22 is accommodated in the positioning groove 111, which is convenient for the installation and fixation of the conductive arm 22.

It can be understood that, in the above embodiment, in order to ensure good electrical connection between the two bearing brackets 15, the conductive piece 23 can be extended into the casing 11 to connect the two bearing brackets 15.

Figure 8:
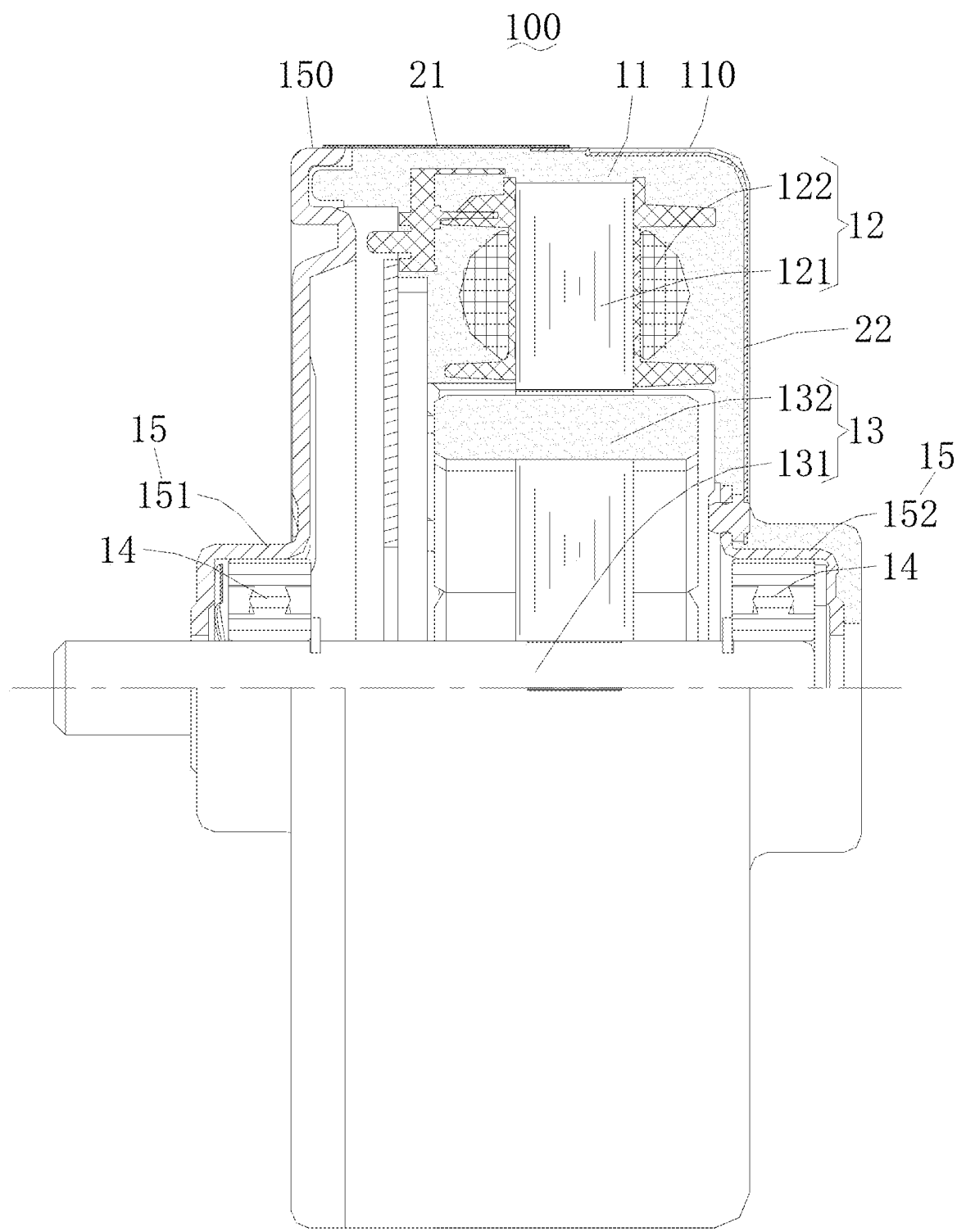
FIG. 8 is a cross sectional schematic structural view of a seventh brushless motor according to an embodiment of the present application.

As shown in FIG. 8, in an embodiment, in case that the circumferential side 150 of one of the bearing brackets 15 extends to the outer circumferential surface 110 of the casing 11, during arrangement of the conductive sheet 21, the conductive sheet 21 can be directly attached to the circumferential side 150 of the bearing bracket 15, and the other one of the bearing brackets 15 is electrically connected to the conductive sheet 21 via a conductive arm 22, such that the two bearing brackets 15 are electrically connected and the conductive sheet 21 is able to simultaneously adjust the equivalent capacitance between the stator core 121 and each of the two bearing brackets 15. Such a structure is particularly suitable for situations where the two bearing brackets 15 have different diameters. For example, when the two bearing brackets 15 are composed of the first bracket 151 and the second bracket 152, the circumferential side 150 of the first bracket 151 extends to the outer circumferential surface 110 of the casing 11, and the second bracket 152 can be a part only supporting the corresponding bearing 14 and form an integral structure with the casing 11 by injection molding, in such case, during the arrangement of the conductive sheet 21, the conductive sheet 21 can be attached to the circumferential side 150 of the first bracket 151, and the second bracket 152 can be connected to the conductive sheet 21 via the conductive arm 22.

It can be understood that, in some embodiments, if the casing 11 is in a structure having two open ends and the two bearing brackets 15 are both used as end covers to cover the two ends of the casing 11, and the circumferential side 150 of each bearing bracket 15 extends to the circumferential surface 110 of the outer surface of the casing 11, in such case, the conductive sheet 21 can also be attached to the circumferential side 150 of one of the two bearing brackets 15, and the other one of the two bearing brackets 15 is connected to the conductive sheet 21 via the conductive arm 22.

As shown in FIG. 9, in an embodiment, if the casing 11 is in a structure having two open ends and the two bearing brackets 15 are both used as end covers to cover the two ends of the casing 11, and the circumferential side 150 of each bearing bracket 15 extends to the circumferential surface 110 of the outer surface of the casing 11, in such case, the conductive sheet 21 is attached to the circumferential sides 150 of both the two bearing brackets 15, such that the two bearing brackets 15 are electrically connected via the conductive sheet 21, and the capacitive reactance between the stator core 121 and each of the two bearing brackets 15 can be directly adjusted by the conductive sheet 21.

As shown in FIG. 8, in the above embodiment, the conductive arm 22 is a separate metal sheet arranged at the casing 11, which facilitates the installation and fixation thereof and ensures good strength of the conductive arm 22. Furthermore, the conductive arm 22 is arranged within the casing 11, and only a part of the conductive arm 22 which is located on the outer circumferential side of the casing 11 protrudes on the outer circumferential surface, so as to be attached to the conductive sheet 21. Such a structure can better protect the conductive arm 22.

Figure 7:
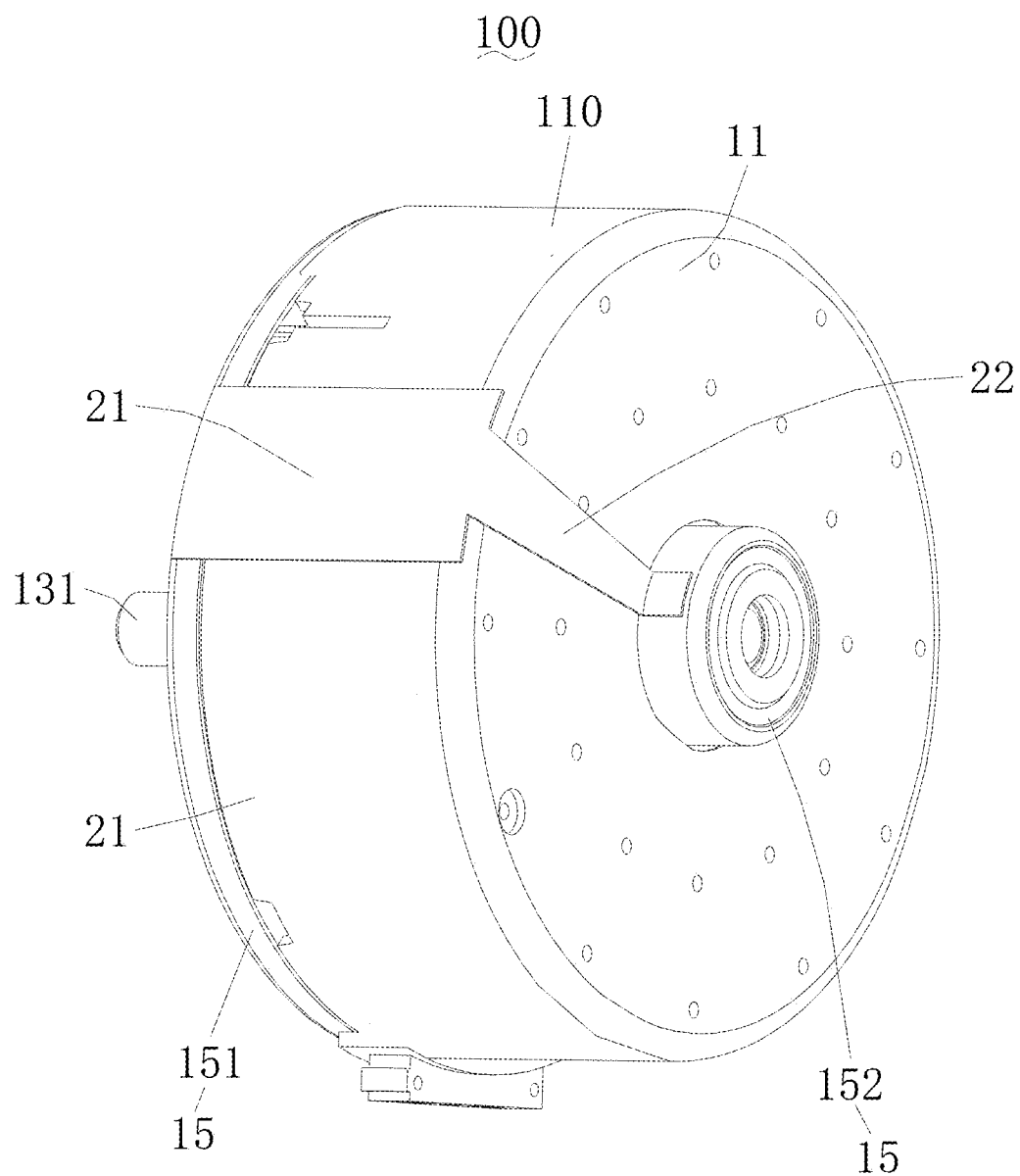
FIG. 7 is a schematic structural view of a sixth brushless motor according to an embodiment of the present application.

As shown in FIG. 7, in some embodiments, the conductive arm 22 may also be a part of the conductive sheet 21, that is, the conductive arm 22 extends from one side of the conductive sheet 21, that is, the conductive arm 22 and the conductive sheet 21 form an integral structure, and the conductive arm 22 is formed by extending a lateral side of the conductive sheet 21, so that the arrangement of the conductive sheet 21 is more convenient and the two bearing brackets 15 can be electrically connected.

Figure 4:
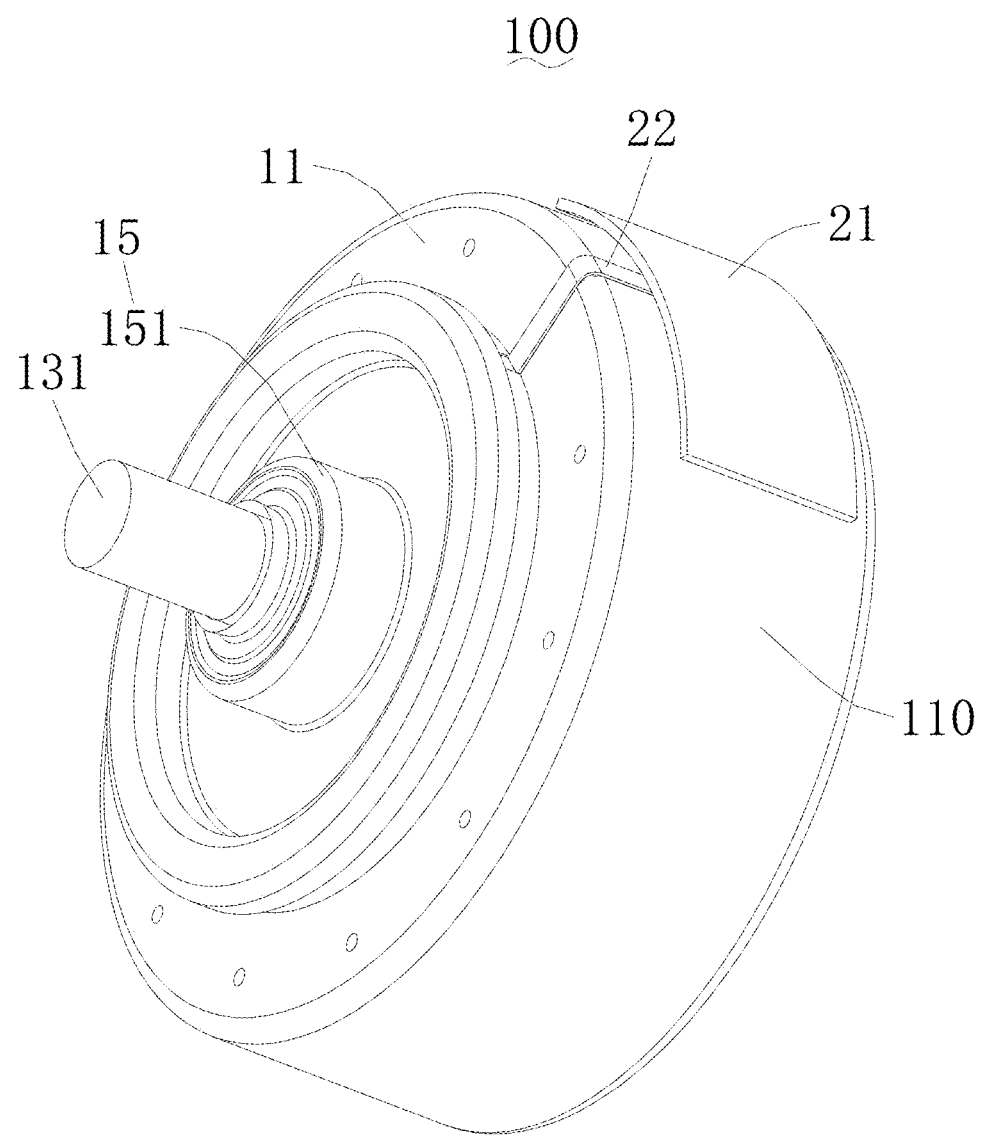
FIG. 4 is a schematic structural view of a fourth brushless motor according to an embodiment of the present application.
Figure 5:
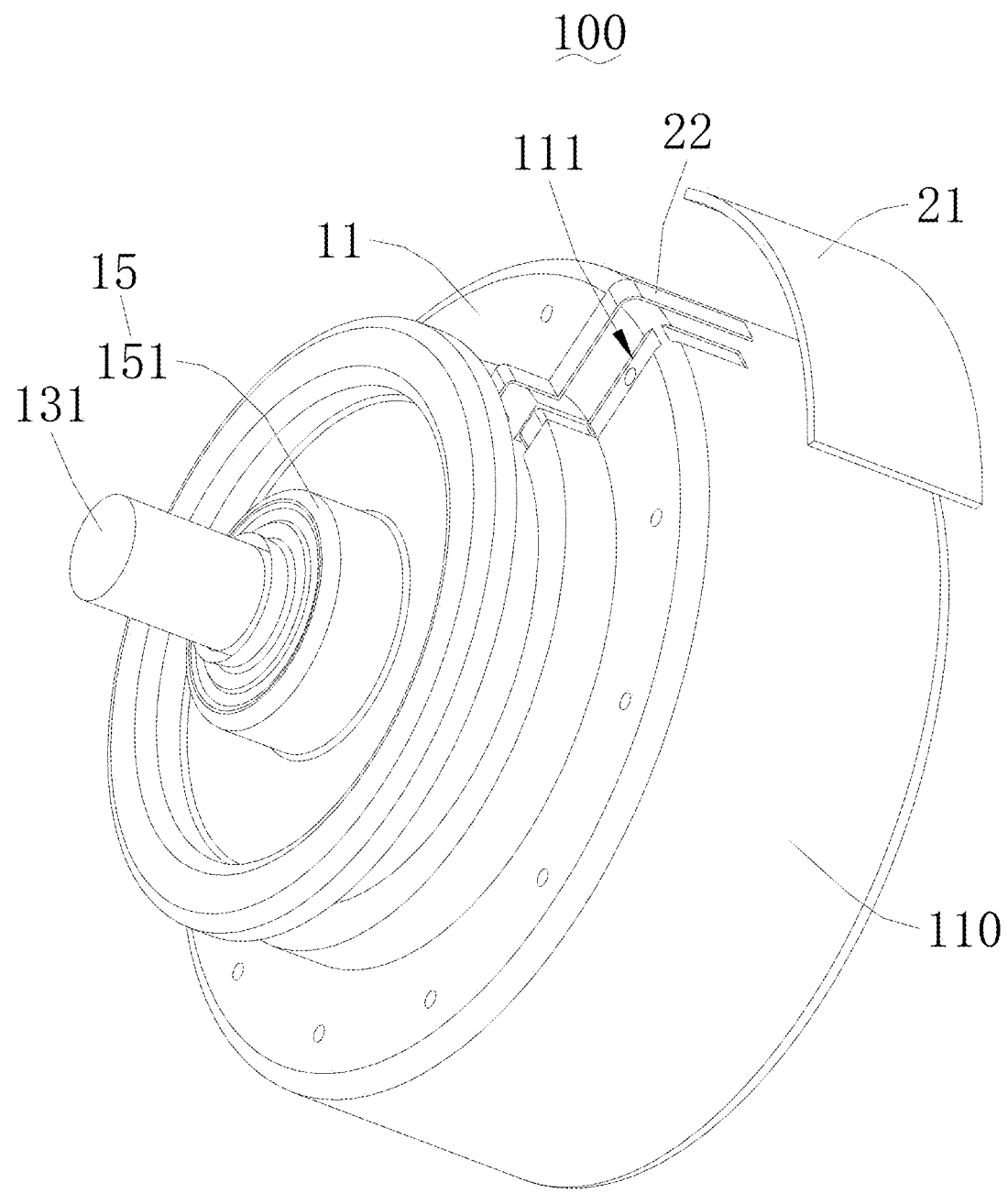
FIG. 5 is a partially exploded schematic structural view of the brushless motor of FIG. 4.

As shown in FIGS. 4-5, in an embodiment, when the two bearing brackets 15 each has an inner diameter smaller than an outer diameter of the casing 11, the two bearing brackets 15 each can be in electrical connection with the conductive sheet 21 via the conductive arm 22. It can be understood that, a conductive piece 23 can also be arranged within the casing 11 to electrically connect the two bearing brackets 15, and one of the two bearing brackets 15 is electrically connected to the conductive sheet 21 via the conductive arm 22. In some other embodiments, conductive arms 22 connected to the two bearing brackets 15 may be respectively provided, and the respective two conductive arms 22 are electrically connected to the conductive sheet 21.

Figure 6:
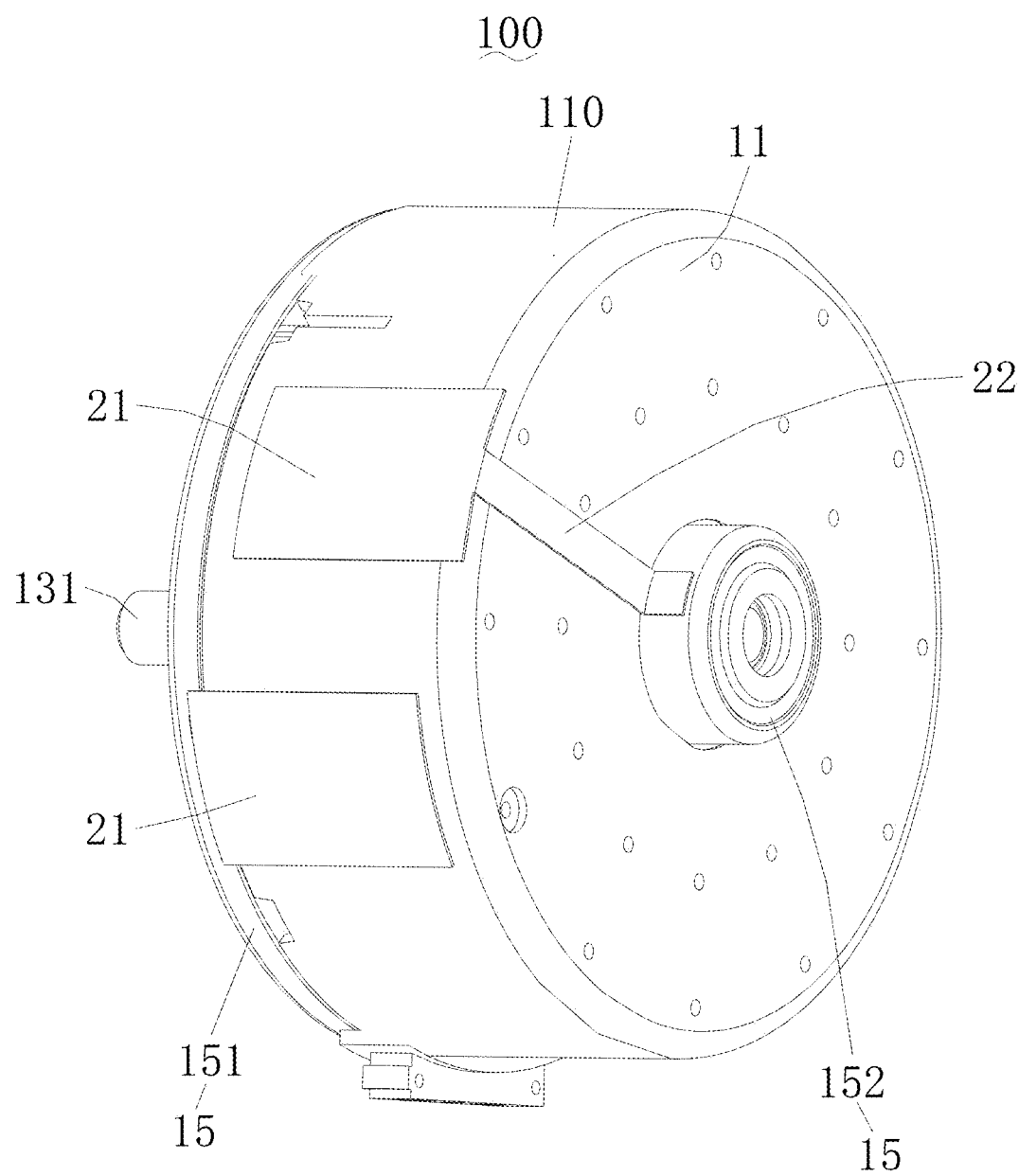
FIG. 6 is a schematic structural view of a fifth brushless motor according to an embodiment of the present application.

As shown in FIG. 6, in an embodiment, a plurality of conductive sheets 21 may also be arranged on the casing 11, and the two bearing brackets 15 are electrically connected to different conductive sheets 21, respectively. In this way, the capacitive reactance between each of the respective bearing brackets 15 and the stator core 121 can be adjusted separately through the conductive sheets 21.

The brushless motor 100 according to embodiments of the present application can effectively balance the electric potential between the inner ring and the outer ring of each bearing 14, reduce the voltage between the inner ring and the outer ring of each bearing 14, and avoid electric erosion between the inner ring and the outer ring of each bearing 14, thereby ensuring excellent and smooth operation of the brushless motor 100, reducing the noise and the vibration, and prolonging the service life. The brushless motor 100 according to embodiments of the present application can be applied to electrical appliances such as air conditioners, washing machines, microwave ovens, refrigerators, and the like.

Furthermore, an embodiment of the present application further provides an electrical equipment, which includes the brushless motor 100 as described in any of the above embodiments. The use of the brushless motor 100 in the electrical equipment can ensure a good service life of the brushless motor 100.

The aforementioned embodiments are only preferred embodiments of the present application, and are not intended to limit the present application. Any modification, equivalent replacement, improvement, and so on, which are made within the spirit and the principle of the present application, should be included in the protection scope of the present application.

What is claimed is:

1. A brushless motor comprising:
a casing being configured to be at least partially insulative;
a stator fixed within the casing, the stator comprising a stator core and a winding wound around the stator core;
a rotor rotatably arranged within the stator, the rotor comprising a rotor core and a shaft passing through the rotor core, wherein two bearings are sleeved on the shaft at positions corresponding to two ends of the rotor core, respectively, and two bearing brackets are installed at two ends of the casing for fixing the two bearings, each bearing bracket comprising an inner ring and an outer ring; and
a conductive sheet being configured for adjusting a capacitive reactance between the stator core and the outer ring of at least one of the two bearing brackets, wherein:
the conductive sheet is spaced apart from the stator core at an outer circumferential side of the stator core, and the conductive sheet is insulated from the stator core;
the conductive sheet and the stator core each at least partially has an area aligned to each other in a radial direction of the stator core to form a capacitor between the conductive sheet and the stator core; and
the conductive sheet is in electrical connection with the at least one of the two bearing brackets, the area of the conductive sheet that is aligned to the stator core defining a capacitive reactance between the stator core and the at least one of the two bearing brackets, the area of the conductive sheet that is aligned to the stator core being selected to reduce a potential difference between the inner ring and the outer ring of the at least one of the two bearing brackets relative to the stator core.

2. The brushless motor of claim 1, wherein the at least one of the two bearing brackets is in electrical connection with the conductive sheet via a conductive arm.

3. The brushless motor of claim 2, wherein:
the two bearing brackets comprise a first bracket and a second bracket;
a circumferential side of the first bracket extends to an outer circumferential surface of the casing, and the conductive sheet is attached to the circumferential side of the first bracket; and
the second bracket is in electrical connection with the conductive sheet via the conductive arm.

4. The brushless motor of claim 2, wherein the two bearing brackets each has an inner diameter smaller than an outer diameter of the casing, and the two bearing brackets each is in electrical connection with the conductive sheet via the conductive arm.

5. The brushless motor of claim 2, wherein:
the conductive arm extends from a corresponding bearing bracket to an outer circumferential surface of the casing, and the conductive sheet is attached to the conductive arm; or
the conductive arm and the conductive sheet form an integral structure, and the conductive arm is formed by extending a lateral side of the conductive sheet; or
the conductive arm is in electrical connection with the two bearing brackets, the conductive arm passes through the casing and is at least partially exposed from the outer circumferential surface of the casing, and the conductive sheet is in connection with the conductive arm.

6. The brushless motor of claim 2, wherein the casing defines therein a positioning groove, and the conductive arm is accommodated in the positioning groove.

7. The brushless motor according to claim 1, wherein circumferential sides of the two bearing brackets both extend to the outer circumferential surface of the casing, and the conductive sheet is attached to the circumferential sides of the two bearing brackets.

8. The brushless motor according to claim 1, wherein the conductive sheet is one of a plurality of conductive sheets, the plurality of conductive sheets are attached to the casing and electrically separate from each other, and the two bearing brackets are electrically connected to different conductive sheets.

9. The brushless motor according to claim 1, wherein at least one conductive sheet is attached to the casing, and the at least one conductive sheet is in electrical connection with both the two bearing brackets.

10. The brushless motor according to claim 1, wherein two conductive pieces are arranged at the casing, and the two conductive pieces are in connection with the two bearing brackets.

11. The brushless motor according to claim 1, wherein the conductive sheet is spaced apart from the stator core, and a distance between the conductive sheet and the outer circumferential surface of the stator core is smaller than or equal to 5 mm.

12. The brushless motor according to claim 1, wherein:
an outer circumferential area of the stator core is defined as S;
the area of the conductive sheet and the stator core aligned to each other in the radial direction of the stator core is defined as S1; and
the area of the conductive sheet is selected such that $S1 \geq S/N$, wherein N is a number of teeth of the stator.

13. The brushless motor according to claim 12, wherein $N \geq 12$, the area of the conductive sheet and the stator core aligned to each other in the radial direction of the stator core is selected to be no smaller than $1/12$ of the outer circumferential area of the stator core.

14. The brushless motor according to claim 1, wherein one side of the conductive sheet is an adhesive side having a conductive property, and the other side of the conductive sheet is an insulating side having an insulating property.

15. The brushless motor according to claim 1, wherein one side of the conductive sheet away from the casing is printed with a logo.

16. The brushless motor according to claim 1, wherein the conductive sheet is a metal foil, a conductive paper, or a conductive coating applied on the outer circumferential surface of the casing.

17. The brushless motor according to claim 1, wherein the outer circumferential surface of the casing defines therein an accommodation groove, and the conductive sheet is at least partially accommodated in the accommodation groove.

18. The brushless motor according to claim 1, wherein the area of the conductive sheet that is aligned to the stator core is selected such that a capacitance between the conductive sheet and the stator core is 10-100 PF.

19. The brushless motor according to claim 1, wherein the conductive sheet is arranged on the outer circumferential surface of the casing; or alternatively, the conductive sheet is arranged within the casing.

20. An electrical equipment comprising the brushless motor according to claim 1.

* * * * *